B. O. TILDEN.

FLUSH TANK OPERATING DEVICE.

APPLICATION FILED OCT. 16, 1908.

12,910. Reissued Jan. 12, 1909.

2 SHEETS—SHEET 1.

Inventor

Bert O. Tilden

Witnesses

Jos. F. Collins.

Robert L. Wallace.

By Harry D. Nacoan

Attorney

B. O. TILDEN.

FLUSH TANK OPERATING DEVICE.

APPLICATION FILED OCT. 16, 1908.

12,910. Reissued Jan. 12, 1909.

2 SHEETS—SHEET 2.

Witnesses

Jos. F. Collins.

Robert L. Wallace

Inventor

Bert O. Tilden

By Harry De Wallace

Attorney

UNITED STATES PATENT OFFICE.

BERT O. TILDEN, OF NEW YORK, N. Y., ASSIGNOR TO AMERICAN SANITARY WORKS, OF NEW YORK, N. Y., A CORPORATION OF NEW JERSEY.

FLUSH-TANK-OPERATING DEVICE.

No. 12,910. Specification of Reissued Letters Patent. Reissued Jan. 12, 1909.

Original No. 821,002, dated May 22, 1906, Serial No. 268,641. Application for reissue filed October 16, 1908. Serial No. 458,144.

*To all whom it may concern:*

Be it known that I, BERT O. TILDEN, a citizen of the United States, residing in New York, in the county of New York and State of New York, have invented certain new and useful Improvements in Flush-Tank-Operating Devices, of which the following is a specification.

The invention has reference to apparatus for operating the flush-tanks which are connected to latrine-bowls, and is more especially directed to such tanks as are arranged contiguous to the bowl. In this class of apparatus it is highly desirable that the mechanism be very easily operable, and such also, as will possess extreme simplicty as to number and action of parts.

The object of the invention is to provide mechanism in which the flush-valve is adapted for operation by a handle freely movable in opposite directions so that there will be no difficulty in operating the same, even though a person is previously ignorant of how to do so, and which is peculiarly connected to the flush-valve so as to actuate the latter by the application of the slightest pressure. The improved mechanism is therefore extremely sensitive as to action of parts and, having in mind the special purpose of the invention, this is highly advantageous.

Specifically speaking the invention consists of an operating device for rocking the flush-valve lever that may be rocked in either direction to swing the lever to open the valve, and which device will be arranged adjacent the user of the closet.

An embodiment of the invention is illustrated on the accompanying sheets of drawings, whereon—

Figure 1:
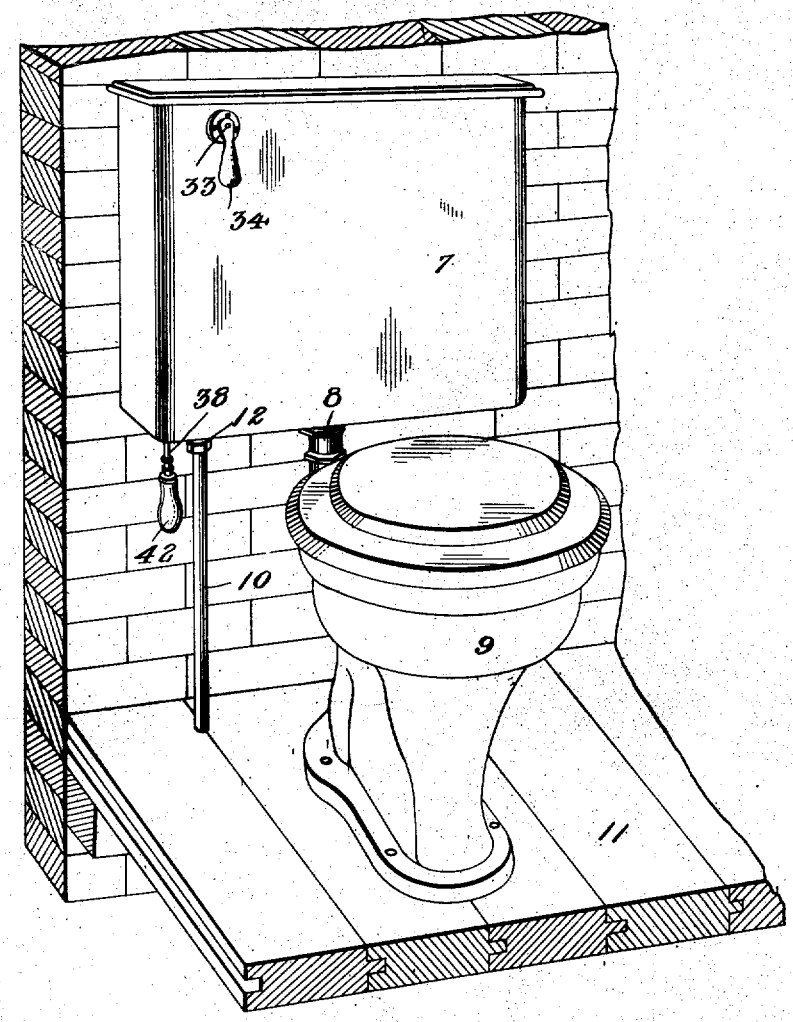
Figure 4:
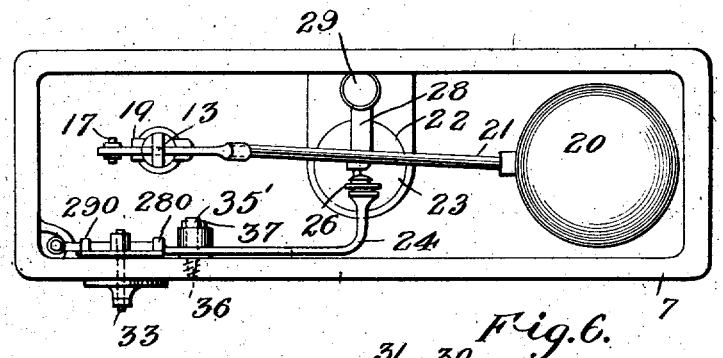
Figure 5:
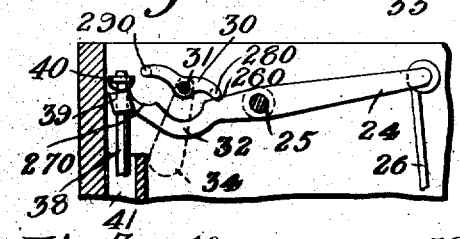
Figure 6:
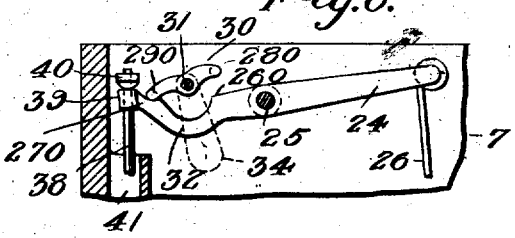
Figure 3:
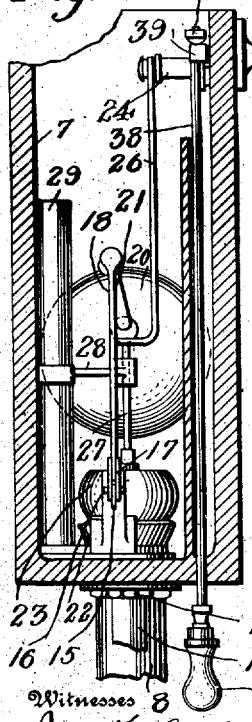
Figure 2:
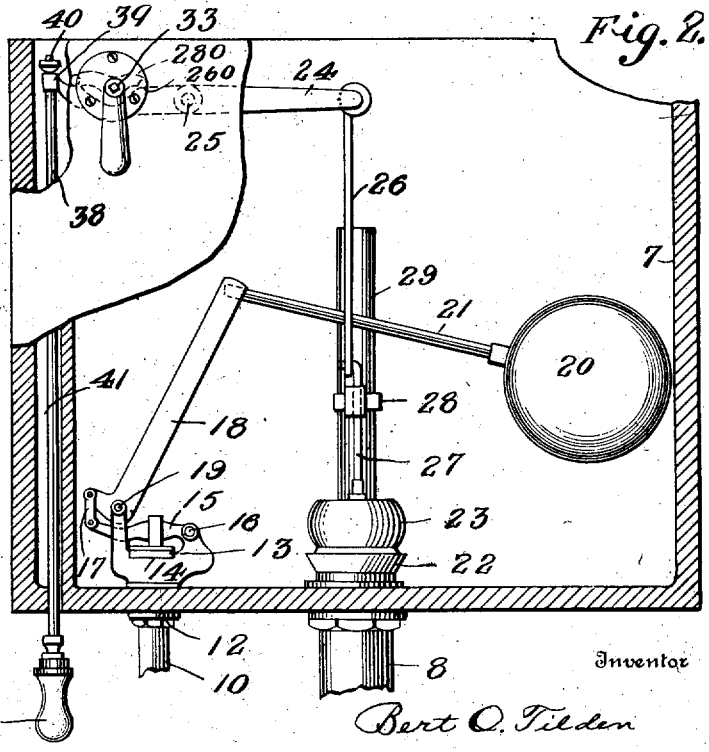

Figure 1 illustrates a perspective view of a latrine-bowl and a flush-tank with the invention applied thereto. Fig. 2 illustrates a front elevational view in section of said tank. Fig. 3 illustrates an end elevational view in section of the same. Fig. 4 illustrates a top plan view of said tank, and Figs. 5 and 6 illustrate diagrammatic views showing the operation of a portion of the operating mechanism.

In the several illustrations similar characters of reference apply to similar parts.

The invention appertains more particularly to that class of flush-tanks which is here designated in a general way as 7 and which is arranged contiguous to and connected by suitable connections 8 above latrine-bowl 9, the tank being supplied in the present instance by a pipe 10, emanating from the floor 11, and which connects with the tank 7 from the bottom by a union 12. Within the tank 7 is located the usual supply-valve 13, carried by a seat 14, and which is operated by a lever 15, fulcrumed at 16, and which is connected by a link 17 to a lever 18, fulcrumed at 19, and which is operated by a float 20, secured thereto by a rod 21, it being understood that when the float is precipitated by gravity the valve 13 will leave its seat 14 to admit the water into the tank and the water will raise the float to close the valve. Also within the tank is the usual valve, comprising a seat 22 and plunger 23, which normally rests upon the seat and which plunger is actuated by a lever 24, fulcrumed to the wall of the tank at 25 and connected to the plunger by rods 26 and 27, the latter in the present instance being guided by a brace 28, suitably disposed within the casing, and which may surround or be connected to the overflow 29.

The lever 24 is provided on its upper side with bearing portions, which may be of any suitable character and formed and located in any suitable manner at that side of the fulcrum 25 which is opposite to that where the rod 26 is connected to the lever. In the present instance these upper portions are in the form of depressions 260 and 270 upon the upper side or edge of the lever 24, and upon these surfaces are adapted to ride the extremities 280 and 290 of a rocking lever 30, fulcrumed at 31 intermediate of the depressed portions 260 and 270 and somewhat above the lever 24 when it is the same as in its normal position, and in order that the lever 24 may clear the fulcrum 31 said lever may, if desired, be depressed or bent, as at 32. The depression 32 permits the location of the contact points 280 and 290 of the rocking lever 30, and the fulcrum 31, in the same plane, or at right angles to the handle 34. The fulcrum 31 in the present instance comprises a spindle, which in the present instance carries a squared extremity 33, which extends to the outside of the wall of the tank 7 and carries a handle 34, which may be rocked, so that the lever may be operated to lift the plunger 23 from its seat 22. If the handle 34 is turned to the left and as seen in Fig. 5, the extremity 280 of the rocking lever 30 will bear upon its corresponding bearing 260 and lift that end of the lever 24 which is connected with the rod 26. If the handle should be turned to the right, as seen in Fig. 6, the free end 290 of the rocking lever 30 will take in its corresponding bearing 270 and lift the lever 24 in a similar manner as above explained. Thus it will be seen that this handle may be turned in either direction, right or left, and the action of the lever 24 will be the same to lift the plunger 23. The form of the ends of the lever 30 is such that the contact extremities thereof, which coöperate with the flush-valve lever 24, are spaced from each other as well as from the fulcrum 31, and furthermore, the handle 34 is pendent from the fulcrum. This construction affords a maximum amount of leverage in operating the handle, accomplished by a comparatively small degree of movement thereof, and with a minimum amount of friction between the parts 30 and 24. The extremities 280 and 290 afford practically point contacts which effect very quick action of the lever 24 in response to pressure on the handle 34. The sensitiveness of operation of the flush-valve 23 is promoted also by the fact that the relation of the levers 30 and 24 permits of free gravitating movement of the handle 34 to its central pendent position, after actuation thereof, whereby there is no likelihood that the lever 24 will become fixed in a position holding the valve 23 open after the bowl 9 has been flushed in the customary manner.

The fulcrum-point 25 for the lever 24 may be formed and located in any suitable manner, but is here illustrated, for cheapness of manufacture, as consisting of a stud 35, which may be screw-threaded, as at 36, into the wall of the tank and which may be provided with a pin 37 for maintaining the lever upon the fulcrum. As a further means for operating the lever 24 in case it is not desired to employ a handle 34 the lever 24 is provided with a connecting-rod 38, which may be inserted into an eye 39, carried by the lever 24, and held in place by a nut 40. This rod passes through a channel 41 in one corner of the tank and extends to the bottom thereof and is provided with a handle 42, so that, if desired, the lever 24 may be operated from the under side of the tank. It will also be understood in this connection that, if desired, this tank may be placed upon the market with both attachments in order to meet caprice of the user.

The arm of the lever 30, remote from the fulcrum 25 of the lever 24, is made longer than the opposite or adjacent arm. When the handle 34 is moved to the right, therefore, the force required to actuate the lever 24 by engagement of the short arm of lever 30 therewith, is substantially equal to that required to accomplish the same result if the handle is moved in the opposite direction and the longer arm of the lever 30 engaged with the lever 24. Or in other words, the flush valve will be raised to the required height by the same angular swing of the handle, regardless of the direction of such swing.

The practical advantages of the above are evident.

Having thus described this invention, I claim—

1. In combination with a closet low-down flush-tank, of a flush-valve within said tank, a rocking lever pivoted within the tank and connected at one side of its fulcrum with the valve and having at the other side of its fulcrum a pair of bearing-faces spaced apart, a spindle projecting through the wall of the tank and provided on its outer end with a fixed operating-handle located within reach of the user seated on said closet, and having fixed on its inner end a rocking lever, likewise having a pair of bearing-faces spaced apart and coöperating with the bearing-faces of the valve-lever, so that on the swinging of said operating-handle in either direction from its normal position the free end of the valve-lever will be depressed and the valve operated.

2. In combination with a closet low-down flush-tank and with a flushing-valve within said tank, of valve-operating mechanism comprising two members, one a relatively long valve-operating lever pivoted within the tank and connected at one side of its fulcrum with the valve and having at the other side of its fulcrum a bearing-face, and a relatively short arm located at one side of the fulcrum of said valve-lever and having a bearing-face in position to engage the bearing-face of the valve-lever, and all located within the tank, a spindle projecting through the wall of the tank with its inner end connected to said arm and forming the fulcrum thereof, and an operating-handle rigidly secured to the spindle on the outside of the tank and within reach of the user seated on said closet so that on the swinging of said handle from its normal position the free end of the valve-lever will be depressed by the arm and the valve operated.

3. In combination, a flush tank, a flush-valve within said tank, a flush-valve lever pivoted between its ends and connected at one end with the flush-valve, a spindle mounted on said tank, a rocking lever carried by the spindle and having a contact extremity arranged to engage the opposite end of the rocking lever, and a pendent gravitative handle located at a right angle to said contact extremity and fixed on the spindle for actuating the rocking lever, said handle being adapted to gravitate to its normal pendent position after movement thereof so as to instantly relieve the flush-valve lever of pressure after raising the flush-valve.

4. In combination, a flush-tank, a flush-valve mounted therein, a flush-valve lever pivoted between its ends to a side of the tank and connected at one end with the flush-valve, a spindle mounted so as to extend through a side of the tank, a rocking lever secured between its ends to one end of the spindle, the opposite ends of said lever being spaced from the spindle and constituting contact extremities adapted to engage the end of the flush-valve lever opposite that connected with the flush-valve and at spaced bearing points, said flush-valve lever being formed with a depression receiving the spindle aforesaid, whereby the contact extremities of the rocking lever are in the same plane as the spindle, and a pendent handle fixed on the other and outer end of the spindle for rocking the lever carried thereby, said handle being arranged at a right angle to the contact extremities aforesaid and adapted to gravitate to its normal pendent position after actuation thereof and in order to instantly relieve the flush-valve lever of pressure thereon when the flush-valve has been raised.

5. In combination, a flush tank, a flush valve therein, a flush-valve lever pivoted between its ends to provide end arms of unequal the flush-valve, a rocking lever pivoted between its ends to provide end arms of unequal length, the extremities of the rocking lever being arranged to engage the end of the flush-valve lever opposite that connected to the valve, and an operating handle for the rocking lever, the longer arm of the rocking lever being the more remote from the fulcrum of the flush-valve lever, whereby the operating handle is movable in either of opposite directions by substantially the same amount of force.

This specification signed and witnessed this 12th day of October, 1908.

BERT O. TILDEN.

Witnesses:
F. W. Elliot,
M. E. Catlin.